Figure 1:
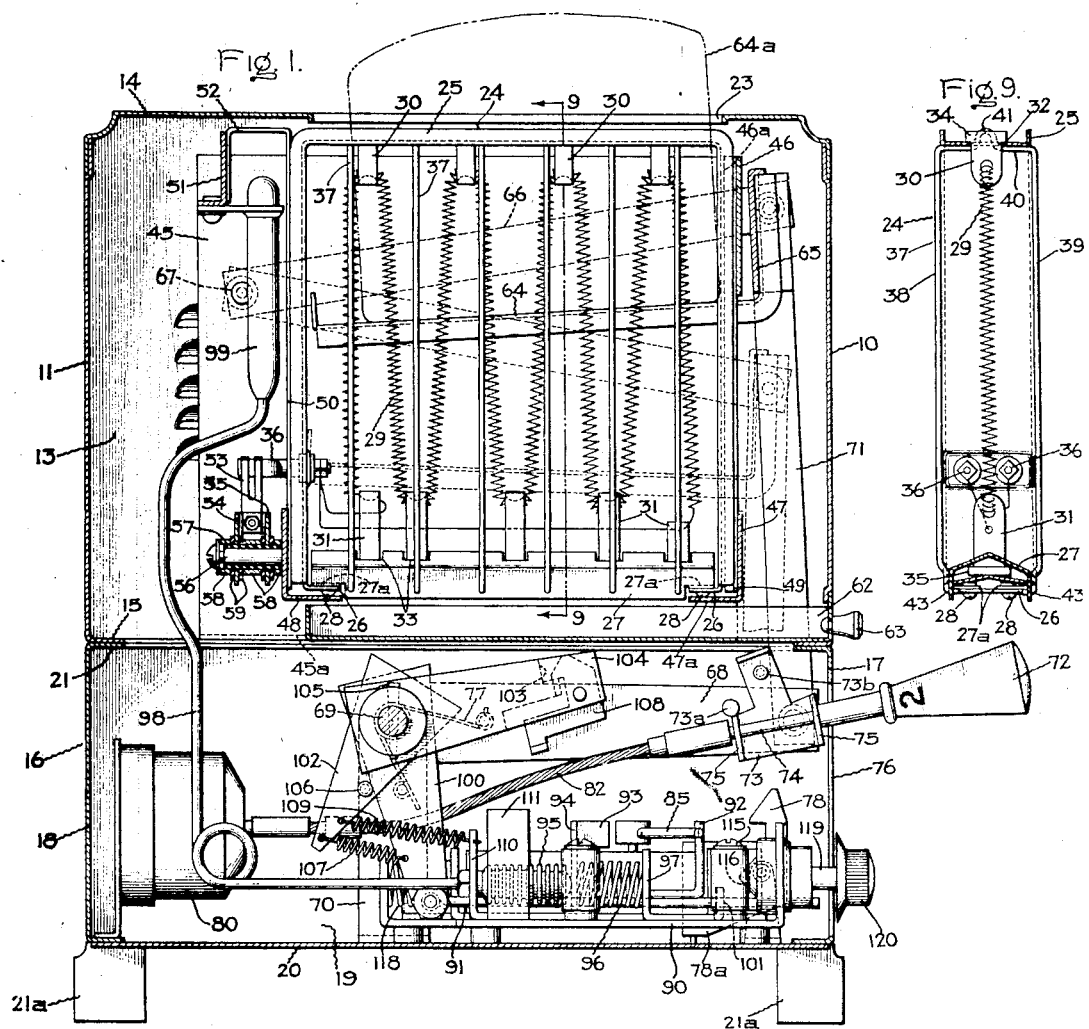

April 20, 1943. J. L. SHROYER 2,317,228
ELECTRIC HEATER
Filed Aug. 8, 1934 3 Sheets-Sheet 1

Inventor:
Jacob L. Shroyer,
by Harry E. Dunham
His Attorney.

April 20, 1943.  J. L. SHROYER  2,317,228
ELECTRIC HEATER
Filed Aug. 8, 1934  3 Sheets-Sheet 2

Inventor:
Jacob L. Shroyer,
by Harry E. Dunham
His Attorney.

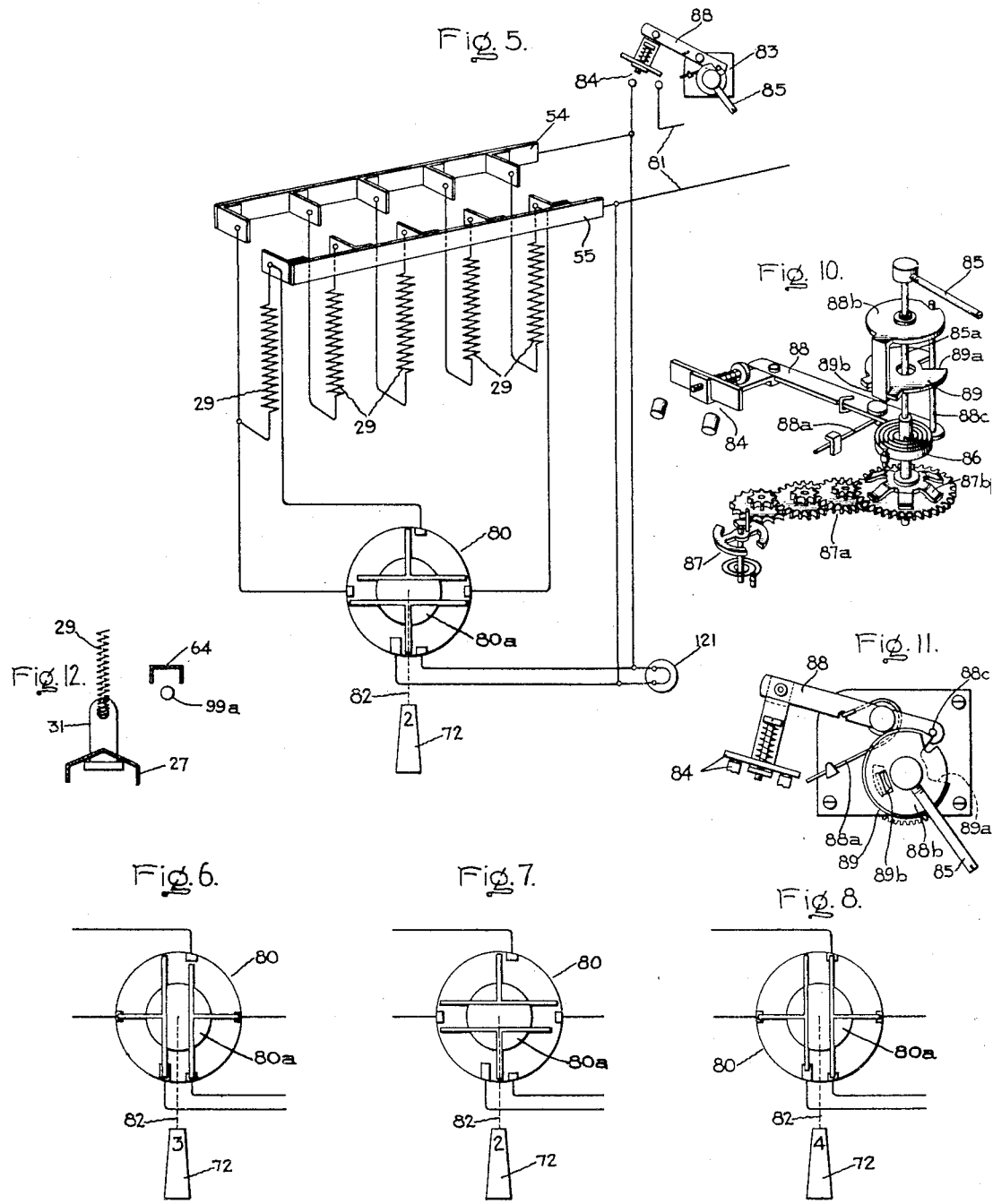

Patented Apr. 20, 1943

2,317,228

UNITED STATES PATENT OFFICE 2,317,228

ELECTRIC HEATER

Jacob L. Shroyer, Oak Park, Ill., assignor to Edison General Electric Appliance Company, Inc., Chicago, Ill., a corporation of New York Application August 8, 1934, Serial No. 738,973

37 Claims. (Cl. 219—19)

This invention relates to electric heaters, more particularly to electrically heated bread toasters, and it has for its object the provision of an improved device of this character.

Although this invention is not limited thereto, it is particularly applicable to electrically heated bread toasters wherein a plurality of slices can be toasted at the same time. It is to be understood, however, that certain features of this invention are applicable equally as well to toasters wherein but a single slice can be toasted at a time.

One of the objects of this invention is the provision of improved timing means for automatically shutting off the heat at the end of a predetermined interval of time when the toasting operation has been employed; and also the provision of improved means for automatically varying this toasting interval in accordance with the temperature of the toasting chamber in order to compensate for the heat stored by the toaster. It will be understood that the temperature of the walls and other parts of the toaster increases with continued use of the toaster, and, therefore, if the timing means measures the same toasting period for successive slices, it is quite likely that eventually the slices will be burned or overtoasted before the heat is cut off at the end of a toasting period. This invention compensates for the temperature increase of the toaster so as to insure a uniformly toasted product.

This invention further contemplates the provision of improved means for moving the slices into and out of their toasting compartments, and the provision of improved means whereby a single operating member is used to move the slices into and out of the toasting chambers and to control the operation of the timing means. Moreover, it is contemplated that the single operating member will be used to control a suitable switching device arranged so that the heating means for different numbers of toasting chambers can be selectively energized by the operation of the control means.

In accordance with this invention, suitable movable slice trays are provided in the toasting chambers arranged to be moved between toasting positions in the chambers and non-toasting positions with reference to the chambers. A control lever is provided for moving the trays between these positions.

Suitable timing means are provided controlling the heating means for the toasting chambers. This timing means is operably connected to the lever so that when it is moved to operate the trays to their toasting positions, the heating means are energized, and the operation of the timing device is initiated for a subsequent de-energization of the heating means at the end of a predetermined interval of time.

Suitable means responsive to the temperature of the toasting chambers is provided for controlling the timing means to vary the toasting interval in accordance with the temperature of the toasting chambers so that the toasting period is shortened as the temperature increases, whereby successive slices are uniformly toasted.

A suitable switch, preferably of the rotary type, is provided for selectively controlling the energization of the heating means so that if one or more of the toasting compartments is not needed, the heating means for these chambers will not be energized at the same time the heating means for the remaining chambers are energized. This switch is also controlled by the operating lever provided for the slice trays and the timing means.

Figure 2:
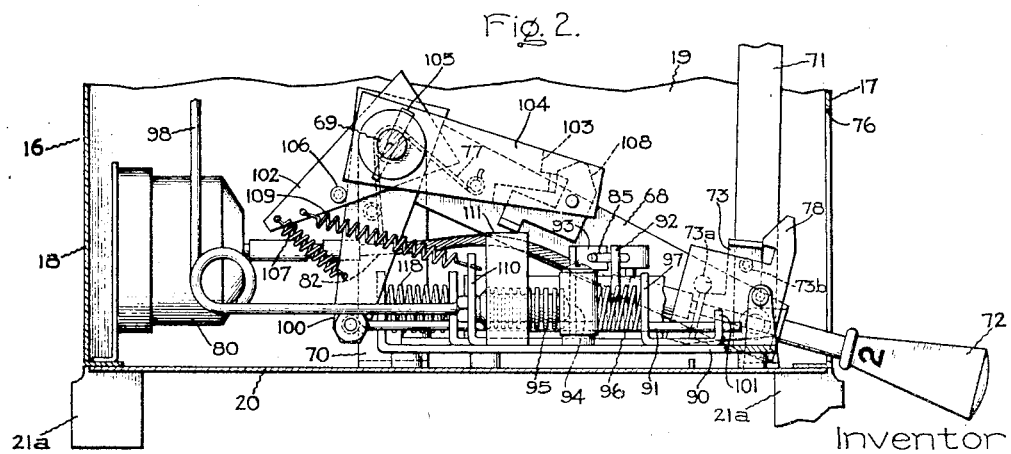
Figure 3:
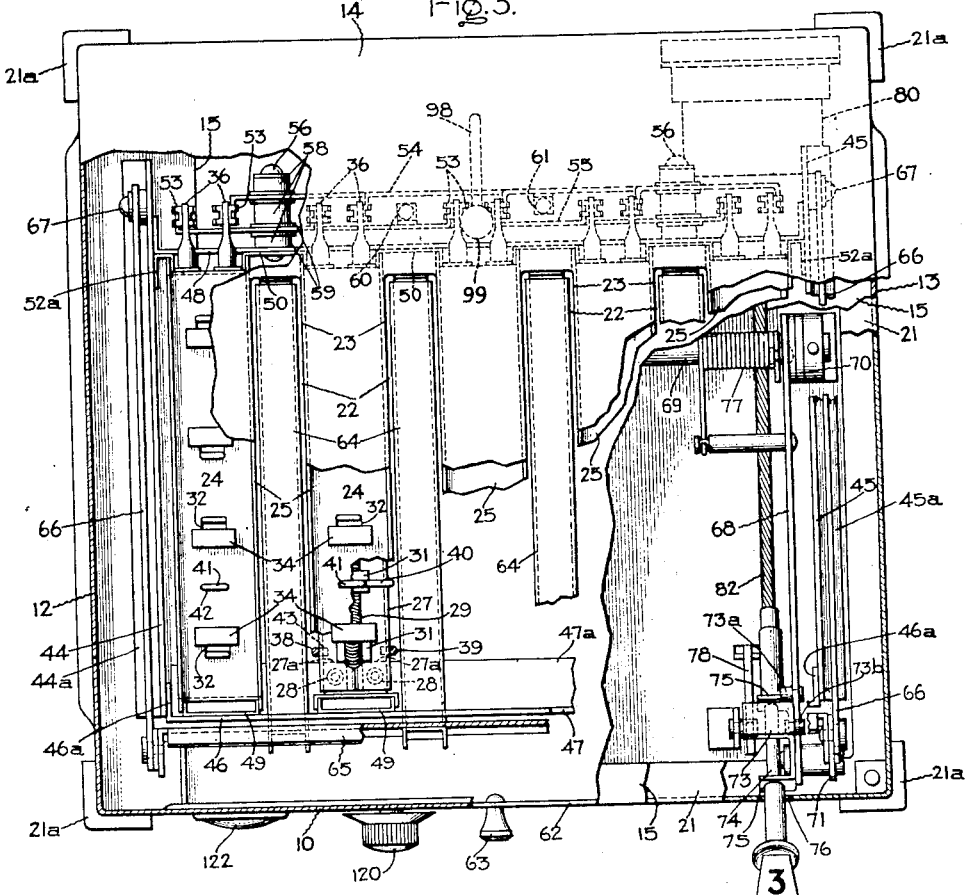
Figure 4:
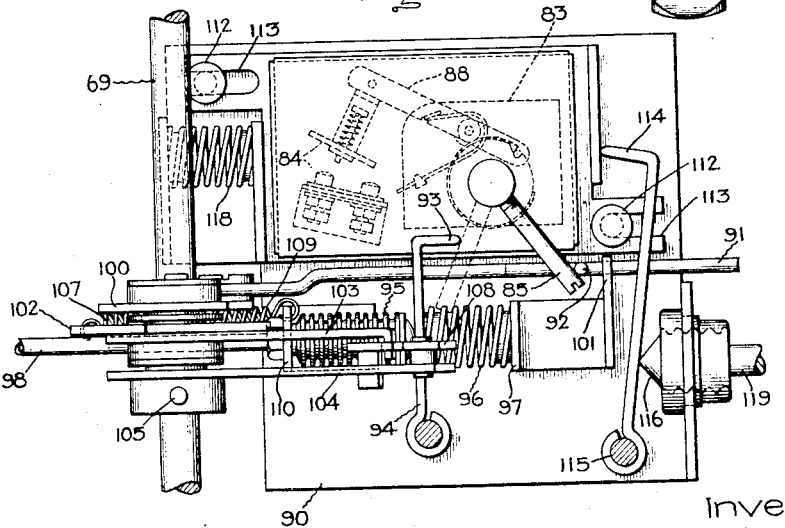

For a more complete understanding of this invention, reference should be had to the accompanying drawings in which Fig. 1 is a side elevation in section of an electric toaster arranged in accordance with this invention; Fig. 2 is a fragmentary view similar to Fig. 1, but illustrating certain parts of the mechanism in different operative positions than they occupy in Fig. 1; Fig. 3 is a plan view of the toaster shown in Figs. 1 and 2, parts being shown in section and parts broken away so as to illustrate certain details of construction; Fig. 4 is a plan view of timing mechanism used in the toaster of Figs. 1, 2 and 3; Fig. 5 is a schematic view illustrating the heating means provided for the toaster of Figs. 1, 2 and 3, the timing device for controlling these heating means and also suitable switching means for selectively controlling the energization of the heating means; Figs. 6, 7 and 8 are diagrammatic views illustrating different operative positions of the switching means provided to control the heating means of the toaster; Fig. 9 is a sectional view taken through the line 9—9 of Fig. 1; Fig. 10 is a diagrammatic view of a clockwork mechanism used in the timing device shown in Fig. 5; Fig. 11 is a plan view of this clockwork mechanism shown in Fig. 10; and Fig. 12 is a diagrammatic view illustrating a modification of certain features of the toaster of Figs. 1-11 inclusive.

Referring to the drawings, this invention has been shown as applied to an electrically heated toaster provided with a plurality of toasting compartments, although it is to be understood that this invention is applicable to an electrically heated toaster wherein but a single toasting compartment is provided. As shown, the toaster comprises a rectangular casing provided with front and rear walls 10 and 11, a pair of side walls 12 and 13, and a top wall 14. Preferably, the front and rear and side walls will be formed integrally, while the top wall 14 will be formed as a separate member so that it can be removed from and conveniently applied to the side walls. Thus, the top wall may be hinged at its rear to the rear wall 11 by any suitable hinge means (not shown). The lower ends of the front, rear and side walls are turned inwardly to provide a horizontal flange 15 which rests upon a suitable rectangular base 16. This base, as shown, is provided with a front wall 17, a rear wall 18, side walls 19 and a bottom wall 20. The upper ends of the front, rear and side walls are provided with an inturned flange 21 upon which the flange 15 of the upper casing rests. These flanges are secured together in any suitable manner, as by means of screw fastening means (not shown), or by welding. The flanges 15 provided on the lower ends of the side walls 12 and 13 of the upper casing are considerably wider than the associated inturned flanges 21 provided on the base, as clearly shown in Fig. 3. The base 16 rests upon suitable legs or feet 21a.

The upper casing houses a plurality of heating or toasting chambers or compartments 22 arranged lengthwise of the toaster from front to rear and spaced at substantially uniform intervals crosswise of the toaster. As shown, four of these chambers are provided. The upper wall 14 of the toaster is provided with a plurality of elongated openings 23, as shown in Figs. 1 and 3, through which the slices are inserted in and withdrawn from the toasting chambers.

The toasting chambers are defined on the sides by means of the five heating elements 24 arranged on each side of the compartments of the heating chambers.

As shown, each heating element comprises a metallic frame 25 having the form of an inverted U, its cross-section being of channel shape, as shown in Figs. 3 and 9. At the bottom of the vertical legs of the U-shaped frame are provided inturned flanges 26 on which a suitable channel-shaped base member 27 rests. This member is secured to the flanges 26 by means of inturned flanges 27a on the member 27 and screw fastening means 28. It will be observed that the U-shaped member 25 and the base 27 form a rectangular framework. Within this framework is supported a continuous helical resistance conductor 29, which as shown in Fig. 1, is formed into a plurality of convolutions extending vertically of the frame, the bends of the convolutions at the upper and lower ends being supported by means of electrically insulating supporting members 30 and 31 supported by the upper and lower sides of the rectangular frame. These insulators 30 and 31 are threaded through apertures 32 and 33 provided in the upper and lower sides of the frame, and are provided with enlarged heads 34 and 35 (Fig. 9) respectively to prevent movement of the insulators through their openings; that is, these enlarged portions anchor the insulators against the tension of the resistance conductor 29. The ends of the resistance conductor, as shown in Fig. 1, terminate at the lower side of the frame and are supported by insulators 31, similar to the insulators 31 supporting the lower bends of the convolutions. These ends of the resistance conductor are electrically connected to a pair of terminal members 36, which, as will be pointed out in greater detail hereinafter, are arranged to be electrically connected with a suitable electrical supply source.

Each of the heating units is completed by a number of guard wires 37 arranged on opposite sides of the plane containing the resistance conductors 29. These guard wires 37 are of hairpin formation, each being provided with vertically arranged legs 38 and 39, as shown in Figs. 3 and 19. These legs are connected at the top by means of a base 40 which is provided in the center thereof with an upraised or bent portion 61 that is received in an aperture 42 (Fig. 9) in the upper side of the metallic heater frame 25. The lower ends 43 of the guide wires are turned inwardly at an angle to the vertical portions 38 and 39, as clearly shown in Figs. 3 and 9, and are received in apertures provided for them in the base portion 27 of the heater framework. The heaters are so proportioned when they are positioned in the upper casing on opposite sides of each heating compartment, the vertical legs 38 and 39 of the guide wires will form guards for adjacent sides of adjacent heating compartments.

The heating units are supported in vertical positions in the upper casing by means of a metallic framework which comprises a pair of upright metallic plates 44 and 45 arranged at the sides of the upper casing and provided with flanges 44a and 45a at their lower ends which rest upon the flanges 15 of the side walls 12 and 13 and to which they are secured in any suitable manner, as by welding or by means of suitable screw fastening means (not shown). These plates 44 and 45 at their upper front ends are connected by means of a transverse metallic member 46 which, as shown in Figs. 1 and 3, is provided with inturned flanges 46a which are secured to the side plates in any suitable manner, as by welding or by means of screw fastening means, (not shown). The lower front ends of the side plates 44 and 45 are secured together by means of a similarly arranged metallic member 47 located adjacent the lower edges of the plates. This member, however, is provided with an inturned flange 47a which functions to support the front ends of the heating elements, as shown in Fig. 1. Arranged adjacent the lower rear edges of the plates 44 and 45 is a transverse metallic member 48 which is similar in shape to the front metallic member 47. This member 48 functions to support the heating elements at the rear.

The heating elements are retained in a vertical position by means of suitable guide means which also provides for the ready insertion and withdrawal of the heating units into and from their supporting framework. This supporting and guiding means comprises a plurality of vertically arranged channel members 49 at the front of the heating compartment. These members 49 are secured at their upper and lower ends to the transverse metallic members 46 and 47 respectively. The channel members are proportioned to slidably receive on their outer edges the vertical portions of the metallic channel-shaped heating frames 25, as clearly shown in Fig. 3.

At the rear, the units are supported by means of channel members 50 which are arranged in staggered relation with reference to the front channel members 49, and which, as shown in Fig. 3, embrace the vertical portions of the metallic frames 25 of adjacent heaters, rather than receiving both flanges of a single frame as do the front channel members 49. These channel members 50 at the rear are secured at their lower ends to the transverse metallic member 48 of the framework in any suitable manner, as by welding, and at their upper ends are connected in a similar manner to a metallic plate 51 arranged transversely of the toaster and connected at its ends to the two side plates 44 and 45. The plate 51, as shown in Fig. 1, is positioned somewhat back of the lower plate 48, and the upper ends of the members 50 are provided with extensions 52 of inverted U-shape which are secured to the transverse member 51 in any suitable manner, as by welding. The outside flanges of the outside heating units at the sides of the toaster slide in U-shaped vertically arranged channels 52a, as shown in Fig. 3. These members 52a are suitably secured to the side plates 44 and 45, as by means of welding.

It will be observed that the front and rear vertically arranged channel members 49, 50 and 52a function as guides for the heating units into which they may be moved and from which they may be withdrawn by sliding them vertically relative to the casing. As pointed out in a previous portion of this specification, the top wall 14 is removable so that it can be moved to open the casing whereby the heating elements can be conveniently inserted in or removed from the toaster.

Suitable means are provided for automatically electrically connecting the terminal members 36 of the heating units to suitable supply busses when the heating elements are slid into their toasting positions. This means comprises a pair of spring contact clips 53 which are supported in an upright position by means of bus bars 54 and 55, respectively. These bus bars in turn are supported by means of a pair of studs 56 which are secured to the lower transverse metallic plate 48. These studs 56, as shown, are surrounded by insulating sleeves 57 about which a plurality of separated collars 58 are arranged. The pins 56 and the insulating sleeves 57 are extended through apertures provided for them in the bus bars 54 and 55, and the bus bars are electrically insulated from the collars 58 encasing the insulating sleeves 57 by means of insulating washers 59. The insulating sleeves 57 and the washers 59 may be formed of any suitable electrically insulating material, such as mica.

The bus bars 54 and 55 are provided with terminals 60 and 61 respectively which are electrically connected to a suitable supply source, as will be pointed out in greater detail hereinafter. It will be observed in view of the foregoing arrangement that when the heating units are slid into their respective positions in the toasting compartments, their terminals 36 are automatically electrically connected to the supply bars 54 and 55 through the medium of the spring terminal members 53.

Arranged below all of the heating compartments is a suitable drawer 62 which functions as a crumb tray and also which divides or separates the heating compartments from the base 16. This drawer is provided with a knob 63 whereby it can be conveniently inserted in and withdrawn from the toaster. The drawer rests upon the relatively wide flanges 15 of the side walls 12 and 13 of the upper casing.

Arranged within each of the heating compartments is a suitable tray or support 64 arranged to support a slice of bread 64a. These trays, as shown in Fig. 1, have an L-shape, the long arm of the L being arranged substantially horizontally within the associated heating chamber, while the short arm extends upwardly vertically at the front of the toaster where it is connected with a transverse metallic supporting plate 65. The trays 64 are rigidly secured to the supporting plate 65 in any suitable manner, as by welding. The opposite ends of the transverse plate 65 are pivotally secured to relatively long levers 66 which extend backwardly toward the rear of the toaster on the outside of the side plates 44 and 45 and to which they are secured at their rear ends by means of suitable pivotal connections 67.

The trays 64 are actuated between non-toasting positions in which they are shown in full lines in Fig. 1 to toasting positions in which they are shown in dotted lines in Fig. 1 by means of a suitable lever 68. The lever 68 is rigidly secured to a shaft 69 arranged transversely of the base 16 and supported at its opposite ends in bearings 70 which are mounted on the bottom wall 20 of the base. The lever 68 is mechanically connected with one of the pivoted levers 66 carrying the tray supporting plate 65, for example the right hand one as viewed in Fig. 3, by means of a link 71 which link extends through a slot provided for it in the flange 15 of the adjacent side wall 13 up into the upper casing outside of the right hand supporting plate 45.

The lever 68 for the trays 64 is provided with an operating handle 72 which is mechanically connected to the lever by means of a bracket 73 that is pivotally mounted on the lever 68 for limited movement relative to the lever. A pin 73a on the lever 68 arranged to engage the bracket limits movement of the bracket in a clockwise direction, while a pin 73b on the bracket arranged to engage the lever 68 limits movement of the bracket in a counter-clockwise direction. The handle 72, as shown, is provided with a shaft or pin 74 which extends through bearings 75 provided for it in the member 73, whereby the handle may be rotated with reference to the lever 68 for a purpose to be explained hereinafter. The operating handle 72 is located on the exterior of the front of the base 16 which is provided with a slot 76 in its front wall providing for vertical motion of the handle with reference to the base. It will be observed in view of the foregoing discussion that all of the trays 64 will be simultaneously moved to their toasting positions in their heating chambers by depressing the handle 72, whereas they are moved to their non-toasting positions by elevating the handle 72.

The lever 68, together with its handle 72, are biased to their positions shown in Fig. 1 wherein the trays 64 are in their non-toasting positions, by means of a torsion spring 77 (Figs. 1, 2 and 3), which is mounted in the shaft 69 and connected to the lever so as to bias the lever 68 toward its position shown in Fig. 1. The lever 68 is depressed to its position shown in Fig. 2 so as to move the trays 64 into their toasting positions and is locked in this position by means of a latch 78 which is pivotally mounted on the bottom wall 20 of the base and which is provided with a counter-weight 78a which biases the latch to its position shown in Fig. 1. When the handle 72 is depressed to its position shown in Fig. 2, the latch 78 engages the member 73 to hold the lever 68 in its downward position and thus hold the trays 64 in their toasting positions. In order to release the lever 68 it is merely necessary to move the handle 72 upwardly a short distance. This movement of the handle rotates the bracket 73 about its pivot on lever 68 in a counter-clockwise direction so as to release it from the latch member 78, thereby permitting the lever 68 to be moved upwardly by the torsion spring 77.

The electrical resistance elements 29 of the five heating elements defining the four heating compartments are controlled by means of a multiple position switch 80 which preferably is of the rotary type. The electrical connections between the electrical supply source 81 provided for the heating elements, and the control switch 80 are shown diagrammatically in Figs. 5 to 8 inclusive. As shown in these figures, when the toaster is connected with the electrical supply source 81, the three intermediate resistance elements 29 are energized, because they are directly connected to the bus bars 54 and 55. In the position of the control switch 80 shown in Fig. 5, the two outside heating elements 29 are deenergized. Thus, in this position of the control switch 80, the heating means for the two center compartments are energized so that two slices of bread can be toasted. The heating means for the two outer chambers are not energized in this position of the switch 80. The position of the switch shown in Fig. 7 similarly causes the two outside heating elements to be deenergized. If it be desired to toast three slices of bread, the switch will be rotated to its position shown in Fig. 6, in which position the right hand resistance element 29 is energized as well as the three intermediate resistance elements so that the three right hand toasting compartments are heated. If it be desired to toast four slices at once, the switch is moved to its position shown in Fig. 8 wherein the left hand resistance element 29 is energized along with the rest. This applies heat to all four of the heating compartments. It is desirable at this time to use a standard four position switch, and it is for this reason that the two controlling positions of the switch shown in Figs. 5 and 7 give an identical control of the heating elements, that is, energize the elements for two slices. It is to be understood, however, that any suitable control switch may be used to give the above described controls of the heating elements.

The control member 72 for the trays is utilized to control the selector switch 80. For this purpose, the rotary element 80a of the switch 80 is mechanically connected with the spindle 74 by means of a flexible shaft 82. It will be observed that if the control member 72 is rotated in its bearings 75, the flexible shaft 82 will be operated to rotate the rotary member 80a. Preferably, the handle member will be square in section and will be provided on its four sides with the numerals "2," "3" and "4" to designate the particular position of the switch. These numerals will be so arranged that when the handle is turned with a numeral facing upwardly, the switch will be in the corresponding controlling position. For example, if it be desired to toast three slices, the handle will be turned until the numeral "3" appears on the upper face of the handle 72. In this position of the switch the three right hand toasting compartments will be heated. It will be noted that two sides of the handle 72 are provided with the numeral "2" corresponding to the controlling positions shown in Figs. 5 and 7.

Suitable timing means are provided for controlling the energization of the heating elements which are energized so as to deenergize the heating elements upon the completion of the toasting operation. For this purpose, a suitable clockwork mechanism 83 is provided. This clockwork mechanism controls a switch 84 arranged between the supply source 81 and the bus bars 54 and 55 and the switch 80, as shown in Fig. 5. When the switch 84 is closed, the particular heating elements selected by the switch 80 are energized, whereas when the switch 84 opens these elements are deenergized.

Any suitable clockwork mechanism may be used to control the switch 84 which is provided with a winding lever or member arranged so that the winding of the clockwork mechanism and the subsequent period of operation thereof depends upon the extent that the winding lever is moved. The details of construction of this clockwork mechanism are shown in Figs. 10 and 11. The mechanism comprises a winding lever 85 which is rigidly secured to a winding stem 85a. This stem is connected to a spiral clock spring 86 so that when the lever is moved in a clockwise direction from its position shown in Fig. 10, the spring is energized to return the lever to its initial position when released. The return of the lever to this position is timed by an escapement 87 connected with the shaft 85a through a gear train 87a and a friction drive 87b. This drive 87b provides for movement of the lever 85 in a winding direction independently of the escapement, but effects a driving connection between the winding spindle and the escapement when the lever 85 is released for its return movement. The switch is operated by a pivoted lever 88. This lever is biased in a switch opening direction by means of a spring 88a, and is closed by means of a cam disc 88b rigidly secured to the spindle 85a. This cam disc engages a pin 88c carried by the lever when the lever 85 is operated to wind the clock so as to operate the lever 88 to close the switch. Loosely mounted on the shaft 85a is a second disc 89 having a diameter slightly larger than the diameter of the cam disc 88b, as shown in Fig. 11. The disc 89 is provided with a slot 89a that receives the pin 88c, and is connected with the cam disc by means of a pin and slot connection 89b which provides for limited relative movement between these members. The discs are arranged so that when the lever 85 is turned to wind the clock the pin 88c is moved outwardly by the cam 88b to engage the edge of the disc 89 which holds the switch 84 closed while the timing lever 85 is returning to its initial position. When the lever 85 arrives substantially at this position, as shown in Fig. 11, the pin 88c will ride off of the edge of the disc 89 into the slot 89a, thereby permitting the switch 84 to open.

It will be understood in view of the foregoing description that the lever 85 when moved in a clockwise direction winds the clockwork mechanism and at the same time functions to close the switch 84. The amount of movement of the lever 85 in this direction controls the setting of the clockwork mechanism to operate for a predetermined interval. The clockwork mechanism in operating returns the arm 85 to its initial position shown in Figs. 4, 5, 10 and 11. When the member returns to its position shown in these figures, the switch is operated to its open position.

The clockwork mechanism is mounted upon a suitable base 90 which in turn is supported by the bottom wall 20 of the base.

The winding lever 85 is rotated in a clockwise winding direction to wind the clockwork mechanism by means of suitable rod 91 mounted to slide upon the base 90, and the rod 91 is provided with an upright pin 92 which engages the lever 85 when the rod moves to the left, as viewed in Fig. 4, to rotate the lever in a winding direction.

A suitable stop 93 is provided in the path of movement of the rod 85 to limit the extent of its movement in a winding direction and hence to control the winding period. This stop 93 is mounted upon a pin or lever 94 which is pivoted to the base 90 as shown.

The position of the stop 93 is controlled in accordance with the temperature of the toasting chambers. For this purpose, a suitable metallic bellows 95, constituting an adjustable abutment, is provided which bears against the lever 94 carrying the stop 93. The lever is forced against the bellows or abutment 95 by means of a compression spring 96 interposed between the lever 94 and an abutment 97 carried by the base 90. The bellows is connected by means of a closed conduit or tubular member 98 with a bulb 99 which is located in the upper casing to respond to the temperature of the toasting chambers. As shown, the bellows is located in the center of the toaster immediately back of the centrally arranged heating element. The bellows 95, the tube 98 and the bulb 99 form a closed system which is filled with a fluid having a suitable temperature coefficient of expansion, such as peanut oil. The bulb 99, as shown, is secured to the transverse rear supporting member 51. It is to be understood that the bulb may be located at any suitable part of the toaster, the important feature being that it be so located that it will follow accurately the rise and fall in temperature of the toasting compartments. Thus, it has been found that very satisfactory results are obtained also when the bulb is located beneath one of the bread supporting trays 64; as shown in Fig. 12, a temperature responsive bulb 99a, corresponding to the bulb 99, is located directly under the tray 64 when the latter is in its toasting position. The bulb when thus arranged preferably will have a length substantially equal to the length of the toasting compartment.

It will be observed that the position of the stop 93 is controlled in accordance with the expansion and contraction of the fluid in the closed system so that its position is controlled directly in accordance with the temperature in the toasting compartment. It will be observed that the bulb is located adjacent the central heating element which at all times is energized when the toaster is in operation, irrespective of whether there are two, three or four slices being toasted.

It is contemplated that the lever 72 will operate the rod 91 to wind the clock when the lever is depressed. For this purpose, suitable connection means are provided between the lever 68 and the rod 91. It will be observed that when the rod 91 has been moved toward the left by the depression of the operating member 72, the rod must be released from the lever when the lever has been depressed so as to permit the timing lever 85 to move to its initial position, shown in Fig. 4. It will also be observed that the connection means between the rod 91 and the operating lever must be so arranged that irrespective of the adjustment of the stop 93, the lever 72 can be moved to its lower limit of travel to carry the trays 64 to their fully lowered toasting positions. For these purposes, the rod 91 is connected at its left-hand end, as viewed in Figs. 1, 2 and 4, to a lever 100 which is mounted to rotate freely upon the shaft 69. It will be noted that the rod 91 is supported at its right hand end in a bearing 101 mounted upon the stop 97. The lever 100 is mechanically connected to the lever 68 by means of levers 102, 103 and 104. The levers 102 and 103 are rigidly secured together, as by means of welding, and are free to rotate on the shaft 69. The lever 104, however, is rigidly secured to rotate with the shaft 69 by means of a pin 105. The lever 100 is biased against a stop 106 upon the lever 102 by means of a tension spring 107. The lever 103 is mechanically connected to the lever 104 by means of a latch 108 when the members are in their positions shown in Fig. 1. It will be observed in view of the foregoing discussion that when the lever 68 is depressed to move the trays 64 to their toasting positions, the lever 104 will be moved with it, and the levers 103, 102 and 100 in turn will be moved as a unit with the lever 100 by reason of the latch connection between the levers 103 and 104. The lever 100 is caused to move with the lever 102 by reason of the tension spring 107 interposed between these members. When the timing lever 85 engages the stop 93, the lever 100 will cease to move, while the levers 102, 103 and 104 will be permitted to move with the operating lever 68, the spring 107 permitting this relative movement. When the lever 68 reaches its lower limit of movement and is latched by the member 78, the latching member 103 is released to permit the levers 100, 102 and 103 to rotate in a counterclockwise direction as a rigid structure to their initial positions shown in Fig. 1 under the influence of a tension spring 109. This spring, as shown, is connected at one end to the lever 102 and at its other end to a fixed abutment 110 mounted upon the base 90. The latch 108 is released by means of an abutment 111 mounted upon the base 90 and positioned to engage the latch to release it the instant the lever 68 reaches its lower limit of travel and the latch 78 engages the lever bracket 73 to lock it in the down position. This release of the operating rod 91 is important, because it is necessary to free the pin 92 to move to its original position shown in Figs. 1, 2 and 4, in order to permit the timing lever 85 to move in a counterclockwise direction by its clockwork mechanism as it unwinds; and further, it permits the attendant to move the handle 72 upwardly to move the slices 64a from their compartments for inspection independently of the timing mechanism.

Thus, it will be observed that irrespective of the position of the bellows 95, the operating lever 72 is permitted to move to its lower limit of travel, the flexible connection between the rod 91 and the operating lever 68 providing the necessary relative movement between the timer and the operating rod.

The basic time for different kinds of bread is changed by varying the relative positions of the timing lever 85 and the stop 93. For this purpose, the timing mechanism is mounted to move upon the base 90. As shown, the timing mechanism is secured to the base 90 by means of a pair of pins 112 (Fig. 4) which fit in slots 113 provided for them in the timer. It will be observed by reason of this arrangement that the timer can be shifted longitudinally of the base 90 with reference to the stop 93. Bearing against the right hand edge of the timer is a suitable lever 114 pivotally mounted at 115 to the base. This lever bears against a suitable mechanical stop member 116 which has a threaded connection with a bushing 117 so that when the stop 116 is rotated, it will vary the position of the lever 114. The timing mechanism is biased against the lever 114 by means of a compression spring 118. The member 116 is mechanically connected to a pin or shaft 119 which projects from the front wall of the base of the toaster, and on which an operating knob 120 is provided. It will be observed that the position of the timing mechanism, and hence, the position of the winding lever 85 with reference to the stop 93 can be changed merely by adjusting the knob 120. It will be obvious that instead of adjusting the timing mechanism, the bellows 95, together with the stop 93, the spring 96 and its abutment 97, may be mounted upon a movable member which may be adjusted relative to the timing mechanism. It will be clear that any relative movement effected between the stop 93 and the winding lever 85 will vary the distance that the lever 85 is moved when the lever 68 is depressed before it engages the stop. This will vary the basic setting of the timer.

If it is desired a suitable signal, such as an incandescent lamp 121 (Fig. 5), may be provided to give an indication when the timer operates to deenergize the heating units, that is, at the completion of the toasting operation. As shown in the diagrammatic view of Fig. 5, the incandescent lamp 121 is connected so as to be energized when the switch 84 is closed and deenergized when the switch opens. The lamp 121 may be mounted in the base of the toaster behind a suitable colored lens 122 fixed in the front wall of the base.

In the operation of the toaster, the operating member 72 will first be rotated so as to operate the switch 80 to energize the heating means in accordance with the number of slices it is desired to toast. If it be desired to toast three slices, the member 72 will be turned until the numeral "3" appears on the upper side of the handle. Then the timing control member 120 will be adjusted to the desired basic timing period, and the slices of bread placed within the three right hand compartments so as to rest upon the trays 64 which will be in their non-toasting positions at this time. Then the lever handle 72 will be depressed to lower the trays into their toasting positions. When the lever 68 reaches its lower limit of travel, the latch 78 will lock it in its lowered position. The depression of the handle 72 also operates the winding lever 85 of the timer 83 to its position against the stop 93. This operation of the lever 85 closes the switch 84 so as to energize the four right-hand heating elements 29, as viewed in Fig. 5, to apply heat to the three right-hand toasting compartments, and winds the clockwork mechanism 83. When the arm 72 reaches its lower position, the levers 100, 102 and 103 will be released from the lever 68 and returned to their positions shown in Fig. 1. This is important because it permits the attendant to move the lever 68 upwardly independently of the timing mechanism to view the bread during the toasting operation. At the end of the toasting operation, the timing mechanism will open the switch 84 to deenergize the heating elements. The toast, however, remains in the heating chambers until the lever 73 has been released from the latch 78 so that the toast is kept warm by the stored heat of the toaster. When it is desired to remove the toast from the compartments the lever 72 is moved slightly in an upward direction which operation releases the brackets 73 from the latch 78 to permit the spring 77 to elevate the trays 64. If it be desired to toast three more slices, the slices will be placed within their compartments and the member 72 again depressed which, as before, will energize the heating elements and initiate the operation of the timer for a subsequent operation to deenergize the elements at the end of a predetermined interval.

As the temperature of the toaster increases with continued use, the bellows 95 moves the abutment 93 further toward the right, as viewed in Fig. 4, so as to reduce the timing period for each succeeding toasting operation until the temperature of the toaster attains a substantially constant value, after which the bellows no longer is moved toward the right. If the toaster remains idle for any length of time and cools down, the bellows will then move the stop 93 toward the left so as to increase the timing period. If at any time it be desired to change the basic time rating, it is merely necessary to adjust the knob 120.

If it be desired to toast a more or less number of slices, the handle 72 is merely rotated until the corresponding number appears on the upper surface of the handle.

It is to be noted that the timing mechanism is adjusted by the temperature responsive means to measure a predetermined timing period for a subsequent toasting operation in accordance with the temperature in the toaster at the time the toasting operation is started, and that this period of time is not varied while the bread is being toasted.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. An electric toaster comprising a plurality of heating chambers, heating means for said chambers, bread trays in said chambers, means mounting said trays for movement to toasting positions in said chambers and to non-toasting positions remote from said toasting positions, a switch constructed and arranged to selectively control the energization of said heating means to apply heat to certain of said plurality of heating chambers while the remainder are unheated, or to apply heat to all of said chambers at the same time, as desired, and a single operating member for thus selectively operating said switch, and also for operating said trays to move them between said toasting and non-toasting positions.

2. An electric toaster comprising a plurality of heating chambers, separate heating means for said chambers, bread trays in said chambers, means mounting said trays for movement to toasting positions in said chambers and to non-toasting positions remote from said toasting positions, a rotary switch operable to selected controlling positions for effecting the selective energization of said separate heating means, a lever connected with said trays for operating them to their toasting and non-toasting positions, an operating member for said lever rotatably mounted thereon, and a flexible operating shaft connecting said operating member with said rotary switch.

3. An electric toaster comprising a heating chamber, heating means for said chamber, a bread tray in said chamber, means mounting said tray for movement between a toasting position in said heating chamber and a non-toasting position remote from the toasting position, an operating lever for said tray, switching means controlling said heating means and a timing device controlling said switching means, means connecting said lever with said switching means and timing device so that when said lever is operated to move said tray to its toasting position said heating means is energized and the operation of said timing device is initiated to effect the subsequent deenergization of said heating means at the end of a timed period, means for releasing said timing device and switching means from said lever when said tray reaches its toasting position so that said tray can thereafter be moved from its toasting position and returned thereto for toast inspection by said lever while said heating means is heating said chamber and said timing device is operating to measure said interval of time, and means controlling said timing device to vary the timing period responsively to the temperature of said heating chamber.

4. An electric toaster comprising a heating chamber, heating means for said chamber, a bread tray in said chamber, means mounting said tray for movement between a toasting position in said heating chamber and a non-toasting position remote from said toasting position, an operating lever for said tray for moving it between said positions, a timing device controlling the energization of said heating means, means connecting said lever with said timing device so that when said lever is operated to move said tray to its toasting position said timing device is operated to energize said heating means and its operation is initiated to effect the subsequent deenergization of said heating means at the end of a timed period, means biasing said tray to its non-toasting position, means for latching said lever to prevent movement thereof by said biasing means when said lever has been operated to move said tray to its toasting position, means for releasing said timing means from said lever when it is latched by said latching means so that said timing device thereafter functions to time the toasting interval independently of said lever, and said lever can be operated to move said tray from said toasting position toward said non-toasting position for toast inspection and returned to said toasting position, all while the timing device is measuring the toasting interval, and means for releasing said latch to provide for said inspection.

5. An electric toaster comprising a plurality of separate heating chambers, heating means for said chambers, a timing device controlling the energization of said heating means, a control member arranged when operated to one position to energize said heating means and to initiate the operation of said timing device to effect subsequent deenergization of said heating means in a timed interval, a multiple position switch controlling said heating means arranged by movement to selected positions to apply heat either to certain of said heating chambers while the remainder are unheated, or to all of said chambers at the same time, and an operating connection between said switch and said control member arranged so that the switch is operated to said positions by the operation of said control member.

6. An electric toaster comprising a heating chamber, heating means for said chamber, a bread tray in said chamber, an operating lever, a timing device controlling the energization of said heating means, means connecting said lever with said timing device so that when said lever is operated from one to another controlling position said timing device is operated to energize said heating means and its operation is initiated to effect subsequent deenergization of said heating means in a timed interval, means biasing said lever to said one position, means for latching said lever in said other position to prevent its movement therefrom by said biasing means when said lever has been operated to said other position, means for releasing said timing means from said lever when it has been latched by said latching means, and an operable connection between said bread tray and lever arranged so that the tray can be moved by said lever from said toasting position for toast inspection and returned to said toasting position without disturbing the operation of said timing device to measure the toasting interval, said latch being manually releasable to provide for said movement by said lever.

7. An electric toaster comprising a heating chamber, heating means for said chamber, a bread tray in said chamber, means mounting said tray for movement between a toasting position in said heating chamber and a non-toasting position remote from said toasting position, an operating lever for said tray connected to it to move it between said toasting and non-toasting positions, a handle on said lever connected with it so that it can have a slight movement relative to it, a timing device controlling the energization of said heating means, means connecting said lever with said timing device so that when said lever is operated to move said tray to its toasting position said timing device is operated to energize said heating means and its operation is initiated to effect the subsequent deenergization of said heating means in a timed interval, means biasing said tray to its non-toasting position, means for latching said lever against the force of said biasing means when said lever has been operated to move said tray to its toasting position to hold said tray in said toasting position, and means operated by said handle arranged to release said latching means responsively to a slight movement of said handle relative to said lever in a direction to move said tray to its non-toasting position.

8. An electric toaster comprising a heating chamber, electric heating means for said chamber, a bread tray movable to a toasting position in said chamber and to a non-toasting position remote from said toasting position, a member connected to operate said tray movable to a first predetermined limiting position to move said tray to its toasting position and to a second predetermined limiting position to move said tray to its non-toasting position. a timing device controlling the energization of said heating means, a control member movable to energize said heating means and to initiate the operation of said timing device to effect the subsequent deenergization of said heating means in a timed interval, said interval depending upon the extent of movement of said control member, an adjustable abutment in the path of movement of said control member, means responsive to the temperature of said chamber controlling the position of said abutment in said path of movement, and a flexible connection between said control member and said first-named member so that said control member is moved to said abutment irrespective of its position when said first-named member is moved to said first predetermined limiting position to operate said tray to its toasting position, 9. An electric toaster comprising a heating chamber, electric heating means for said chamber, a bread tray movable to a toasting position in said chamber and to a non-toasting position remote from said toasting position, a lever connected to operate said tray movable between first and second predetermined limiting positions to move said tray to its toasting and non-toasting positions respectively, a timing device controlling the energization of said heating means, a control member movable to energize said heating means and to initiate the operation of said timing device to effect the subsequent deenergization of said heating means in a timed interval, said interval depending upon the extent of movement of said control member, an adjustable abutment in the path of movement of said control member, means responsive to the temperature of said heating chamber controlling the position of said abutment in said path of movement, a flexible connection between said control member and said lever so that said control member is moved to said abutment irrespective of its position when said lever is moved to said first predetermined limiting position to operate said tray to its toasting position, means for latching said lever in said first limiting position, and means for releasing said timing device control member from said lever when it reaches said first limiting position.

10. An electric toaster comprising a heating chamber, electric heating means for said chamber, a bread tray movable to a toasting position in said chamber and to a non-toasting position remote from said toasting position, a control lever connected to operate said tray movable between limiting positions to move said tray between its toasting and non-toasting positions, a spring biasing said control lever to move said tray to its non-toasting position, a timing device controlling the energization of said heating means, a control member movable to energize said heating means and to initiate the operation of the timing device to effect the subsequent deenergization of said heating means in a predetermined interval of time, said interval depending upon the extent of movement of said control member, an adjustable abutment in the path of movement of said control member, means responsive to the temperature of said heating chamber controlling the position of said abutment in said path of movement, a pivoted lever, spring means connecting said lever with said timing device control member, latching means connecting said pivoted lever with said control lever so that said control member is moved to said abutment irrespective of its position when said control lever is moved to its limit of movement to operate said tray to its toasting position, means for latching said control lever in its said limit of movement and means for releasing said latching means connecting said control lever to said pivoted lever when said control lever reaches said limit of movement.

11. An electric toaster comprising a heating chamber, electric heating means for said chamber, a bread tray movable to a toasting position in said chamber and to a non-toasting position remote from said toasting position, a first control member connected to operate said tray movable between limiting positions to move said tray between its toasting and non-toasting positions, a timing device controlling the energization member movable to energize said heating means and to initiate the operation of said timing device to effect the subsequent deenergization of said heating means in a timed interval, said interval depending upon the extent of movement of said second control member, an adjustable abutment in the path of movement of said second control member, means responsive to the temperature of said heating chamber controlling the position of said abutment in said path of movement, a flexible connection between said second control member and said first control member so that said second control member is moved to said abutment irrespective of its position when said first control member is moved to its limit of movement to operate said tray to its toasting position, and means for shifting said abutment and second control member relatively to each other to vary the basic setting of said timing device.

12. An electric toaster comprising a plurality of heating chambers, a plurality of separate heating means for said chambers, bread trays movable to toasting positions in said chambers and to non-toasting position remote from said toasting positions, a single lever connected to operate said trays movable between limiting positions to move said trays between its toasting and non-toasting positions, a timing device controlling the energization of all of said heating means, a control member movable to energize said heating means and to initiate the operation of the timing device to effect the subsequent deenergization of said heating means in a timed interval, said interval depending upon the extent of movement of said control member, an adjustable abutment in the path of movement of said control member, means responsive to the temperature of said heating chamber controlling the position of said abutment in said path of movement, a flexible connection between said control member and said lever so that said control member is moved to said abutment irrespective of its position when said control lever is moved to its limit of movement to operate said trays to their toasting positions, means for shifting said abutment and timing device control member relative to each other to vary the basic setting of said timing device, a switch selectively operable to a plurality of controlling positions to selectively control the energization of said heating means and an operating connection between said switch and said control lever.

13. An electric heater comprising heating means, a switch controlling the energization of said heating means, timing mechanism controlling the operation of said switch, a movable member controlling said timing mechanism so as to vary its timing period in accordance with the extent of movement of said member, an abutment for determining the extent of movement of said member, means responsive to the temperature of said heater controlling the position of said abutment, means movably mounting said timing mechanism, and means for shifting the position of the timing mechanism to vary the relative relation of said member with said abutment.

14. An electric heater comprising heating means, a switch controlling the energization of said heating means, a clockwork mechanism controlling the operation of said switch to deenergize said heating means, a winding lever for said clockwork mechanism arranged to condition it to effect a subsequent operation of said switch to deenergize said heating means in a timed interval, the interval of time depending upon the extent of movement of said lever, an abutment for determining the extent of movement of said lever, means responsive to the temperature of said heater controlling the position of said abutment, means movably mounting said clockwork mechanism, and means for movably adjusting the position of said clockwork mechanism so as to vary the position of its winding lever with relation to said abutment to thereby adjust the basic time setting of said clockwork mechanism.

15. In an electric heater, a switch controlling the heating circuit of said heater, a clockwork mechanism controlling the operation of said switch, a winding lever for said clockwork mechanism, the timing period of said clockwork mechanism varying with the winding movement imparted to said lever, means for moving said lever to wind said mechanism, an adjustable stop member in the path of movement of said lever, a bellows arranged to operate said stop member, resilient means biasing said stop member against said bellows, a bulb in thermal relation with said heated device connected in a closed system with said bellows, a medium having a high coefficient of thermal expansion filling said closed system so that said stop is positioned in accordance with the temperature of said heating device to vary the timing period of said clockwork mechanism, means movably mounting said timing mechanism in a predetermined line of motion to vary the position of said winding lever with reference to said stop and thereby vary the time of operation of said mechanism, resilient means resisting the movement of said mechanism in one direction in said line of movement, a second stop bearing on said mechanism arranged to move it against the force of said spring, and an adjustable member controlling the position of said second stop.

16. An electric heater comprising heating means, a switch controlling the energization of said heating means, a timing mechanism controlling the operation of said switch, a lever controlling said timing mechanism so as to vary its timing period in accordance with the extent of movement of said lever, a stop in the path of movement of said lever controlling the extent of movement thereof, means operated responsively to the temperature of said heater controlling the position of said stop, an operating lever for said winding lever movable through substantially a fixed determined distance, and resilient means operably connecting said operating lever with said winding lever so that said winding lever is moved to said stop irrespective of the position thereof when the operating lever is moved through said fixed distance.

17. In a bread toaster, a timing mechanism for terminating the toasting of a bread slice, means comprising a single lever for initiating the toasting of a bread slice and controlling the said timing mechanism, and thermally responsive means for determining the setting of the timing mechanism upon initiation of the toasting interval to fix the duration thereof in accordance with the temperature affecting said member.

18. In a bread toaster, a timing mechanism for terminating the toasting of a bread slice, means comprising single manually operated means for initiating the toasting of a bread slice and winding the said timing mechanism, and thermally responsive means for determining the setting of the timing mechanism upon the initiation of the toasting interval to fix the duration thereof in accordance with the temperature affecting said thermally responsive means.

19. In a bread toaster, a timing mechanism for terminating toasting of a bread slice, means comprising a single control member the movement of which is manually controlled for initiating the toasting of a bread slice and connected to said timing mechanism to control its operation, thermally responsive means for determining the setting of the timing mechanism to fix the duration thereof in accordance with the temperature affecting said member, a bread slice holder mounted for movement between toasting and non-toasting positions, connection means connecting said holder with said single member so as to move the holder to its toasting position when said member is operated to initiate the toasting of said bread slice and to control the timing mechanism to start, and means for operating said connection means to disconnect said timing mechanism from said member when the holder has been moved to said toasting position so that said member can be operated to move said holder to and from said toasting position for inspection of the toast while said timing mechanism is operating to measure the toasting interval.

20. In a bread toaster, a timing mechanism for terminating the toasting of a bread slice, a single means manually controlled for initiating the toasting of a bread slice and connected to said timing mechanism to control its operation, a bread slice holder mounted for movement between toasting and non-toasting positions, means connecting said holder with said manually operated means so as to move the holder to its toasting position when said means is operated to initiate the toasting of the bread slice and to wind the timing mechanism, means for rendering said manually controllable means ineffective to influence the operation of said timing mechanism after said holder has been moved to said toasting position and said timing mechanism is measuring the toasting interval so that the manually controllable means can be operated to move the slice holder to and from its toasting position for inspection of the bread during said interval.

21. In a bread toaster, a timing mechanism for terminating the toasting of a bread slice, a single manually controllable means for initiating the toasting of a bread slice and connected to said timing mechanism to control its operation, thermally responsive means controlling the timing period of the timing mechanism in accordance with the temperature affecting said thermally responsive means, a bread slice holder mounted for movement between toasting and non-toasting positions, means connecting said holder with said manually controllable means so as to move the holder to its toasting position when said means is operated to initiate the toasting of a bread slice and to control the timing mechanism to start, means for rendering said manually controllable means ineffective to influence the operation of said timing mechanism after said holder has been moved to said toasting position and said timing mechanism is measuring the toasting interval so that the manually controllable means can be operated to move the slice holder to and from its toasting position for inspection of the bread during said interval.

22. An electrical toaster comprising a main casing, one or more racks constructed and arranged to move into and out of said main casing, one or more heater units within said main casing, each heater unit consisting of a supporting frame and a heater element constructed and arranged as a single unitary device independent of the other heater units, means for slidably supporting the heater unit frames within said main frame at positions adjacent to said racks while the latter are within said main casing, a pair of bus bars extending longitudinally within the main casing, said bus bars being relatively spaced with respect to each other and extended transversely of the respective heater units, sockets carried by the respective bus bars, there being a pair of such sockets for each toaster unit, and pairs of plugs carried by the respective heater unit frames and connected with the heater element thereof, said plugs being complemental to said sockets and so constructed and arranged that the plugs and sockets may be connected and disconnected by slidable movement of the heater units.

23. An electric toaster comprising a casing, a bread support within said casing, heater units in said casing for applying heat to the opposite sides of a bread slice positioned on said support, each heater unit consisting of a supporting frame and a heater element constructed and arranged as a single unitary device independent of the other heater unit, means for slidably supporting the heater unit frames within said casing on opposite sides of said support, a pair of bus bars within said casing relatively spaced with respect to each other and extending transversely of the respective heater units, sockets carried by the respective bus bars, there being a pair of such sockets for each heater unit, and pairs of plugs carried by the respective heater unit frames and connected with the heater element thereof, said plugs being complemental to said sockets and so constructed and arranged that the plugs and sockets may be connected and disconnected by slidable movement of the heater units.

24. An electric toaster comprising a heating chamber, heating means for said chamber, a bread tray in said chamber, means mounting said tray for movement between a toasting position in said heating chamber and a non-toasting position remote from the toasting position, an operating member for said tray, switching means controlling said heating means and a timing device controlling said switching means, means connecting said member with said switching means and timing device so that when said member is operated to a position to move said tray to its toasting position said heating means is energized at the same time and the operation of said timing device is initiated to effect the subsequent deenergization of said heating means in a timed interval, and means for releasing said timing device and switching means from said member when it is moved to said position so that said tray can thereafter be moved from its toasting position for toast inspection and returned to said position by said member while said heating means is heating said chamber and said timing device is operating to measure said interval of time.

25. An electric toaster comprising a heating chamber, heating means for said chamber, a bread tray in said chamber, means mounting said tray for movement between a toasting position in said heating chamber and a non-toasting position, an operating member for said tray connected to it to move it between said toasting and non-toasting positions, a handle on said member connected with it so that it can have a slight movement relative to it, a switch controlling the energization of said heating means, a timing device controlling the operation of said switch, means connecting said operating member with said switch and timing device so that when said member is operated to move said tray to its toasting position said switch is operated to energize said heating means and the operation of said timing device is initiated to effect the subsequent deenergization of said heating means in a timed interval, means biasing said tray to its non-toasting position, means latching said member to hold said tray in its toasting position against the force of said biasing means when said member has been operated to move said tray to its toasting position, and means operated by said handle arranged to release said latching means responsively to a slight movement of said handle relative to said member in a direction to move said tray to its non-toasting position.

26. In an electric cooking device, the combination with a switch, of a lever movable to actuate said switch, and a thermostatically operable stop arranged in the path of movement of said lever for controlling the extent of movement thereof in accordance with the temperature of said device.

27. In an electric cooking device, the combination with an electric switch therefor and a timing mechanism, of a handle for actuating said switch and operatively associated with said timing mechanism, an adjustable stop for regulating the extent of energization movement of said handle, and a thermostatic element for actuating said stop whereby the extent of movement of said handle is in direct ratio with the temperature prevailing in said device.

28. In an electric cooking device, the combination with a switch, of a timing mechanism, a manually operable lever to actuate said switch and said timing mechanism, and a thermostatically operable stop controlling the extent of movement of said lever in accordance with the temperature of said device.

29. In an electric cooking device, the combination of a switch, a timing mechanism, a manually operable lever for actuating said switch, means operatively connecting said lever with said timing mechanism, a temperature responsive element, and a stop carried by said element and engaging said means, said stop being positionable by said element to increase or decrease the energizing stroke of said lever in accordance with the temperature prevailing in said device.

30. In an electric cooking device, the combination with a switch, a timing mechanism and manually operable means for actuating said switch and said mechanism, of a stop movable in a plane to limit the energizing movement of said means, and a thermostatic element engaging said stop and moving it relatively to said means to shorten or lengthen the energizing stroke thereof in accordance with the temperature of said device.

31. In an electric toaster comprising a timing and switch mechanism, a frame having a compartment for the reception of a slice of toast and an opening through which the toast may be lifted, a liftable toast carrier in said compartment together with a manually controlled device for lowering and lifting the carrier and setting said mechanism, setting means for said mechanism, a member operated by said manually controlled device during the lowering of the carrier for engaging and moving said setting means to set the timing and switch mechanism for a toasting period, and means for moving said setting means out of engagement with said member and away from it after the setting operation is completed to thereby permit the movement of said device to lift and lower said carrier for toast inspection during the toasting operation without resetting or interfering with said mechanism.

32. An electric toaster comprising a heating chamber, heating means for said chamber, a bread tray in said chamber, means mounting said tray for movement between a toasting position in said chamber and a non-toasting position remote from the toasting position, an operating member for said tray movable between toasting and non-toasting positions, switching means controlling said heating means and a timing device controlling said switching means, connection means connecting said operating member with said switching means and timing device when said member is operated to its toasting position to move said tray to its toasting position so that said heating means is energized and the operation of said timing device is initiated to effect a subsequent deenergization of said heating means at the end of the toasting interval, and means for moving said connection means from said operating member and tray when said member reaches its toasting position so that while said timing device is functioning to measure a toasting interval, said tray can be moved away from and returned to its toasting position without resetting said timing device.

33. An electric toaster comprising a heating chamber, heating means for said chamber, a bread tray in said toasting chamber movable between a toasting position in said chamber and a non-toasting position remote from the toasting position, an operating member for said tray attached to the tray and having an operating stroke of uniform length between toasting and non-toasting positions, switching means controlling said heating means and a clockwork mechanism controlling said switching means and having a winding member, means connecting said operating member with said switching means and said winding member so that when said operating member is operated from its non-toasting to its toasting position to move said tray to its toasting position said heating means is energized and said moving member is operated to wind said clockwork mechanism to initiate its operation to effect the subsequent deenergization of said heating means in a predetermined interval of time, means for moving said winding member away from said operating member when said operating member and tray reach their toasting positions so that said clockwork mechanism can operate, means biasing said tray and operating member to their non-toasting positions, and manually releasable means holding said operating member and tray in their toasting positions while said clockwork mechanism is functioning to measure a toasting interval.

34. In an electric toaster comprising a timing and switch mechanism, a frame having a compartment for the reception of a slice of toast and an opening through which the toast may be lifted, a liftable toast carrier in said compartment together with a manually controlled device for lowering and lifting the carrier and setting said mechanism, setting means for said mechanism disposed in the path of and engaged by a part moved by said device during the lowering of the carrier to set the timing and switch mechanism for a toasting period, and means for moving said setting means from said part after the setting operation is completed so that said carrier and manually controlled device can be operated to lift and lower the carrier for toast inspection during the toasting operation without resetting or interfering with said mechanism.

35. In a bread toaster, a timing mechanism for terminating toasting of a bread slice, means comprising a single control member for initiating the toasting of a bread slice, connection means between said control member and said timing mechanism for controlling the operation of said timing mechanism, a bread slice holder mounted for movement between toasting and non-toasting positions, connection means connecting said holder with said single control member so that the holder is moved to its toasting position when said control member is operated to initiate the toasting of said bread slice and to control the timing mechanism to start, and means for moving said connection means between said timing mechanism and control member away from said control member when the holder has been moved to said toasting position so that said control member can be operated to move said holder away from and return it to said toasting position while said timing mechanism is operating to measure the toasting interval without resetting said timing mechanism.

36. In an electric toaster comprising a timing and switch mechanism, a frame having a compartment for the reception of a slice of toast and an opening through which the toast may be lifted, a liftable toast carrier in said compartment with a manually controlled device for lowering and lifting the carrier and setting said mechanism, setting means for said mechanism movable to set the timing and switch mechanism for a toasting period, a member operated by said device for engaging and moving said setting means to set said timing and switch mechanism during the lowering of said carrier to its toasting position, means for disengaging said setting means from said member when said carrier reaches said toasting position and for withdrawing it from said member so that during the toasting operation said member can be operated to move said carrier up from its toasting position for toast inspection and return it thereto all without resetting said timing mechanism.

37. In an electric toaster comprising a timing and switch mechanism, a frame having a compartment for the reception of a slice of toast and an opening through which the toast may be lifted, a liftable toast carrier in said compartment together with a manually controlled device for lowering and lifting the carrier and setting said mechanism, setting means for said mechanism movable from a first position to a second position to set the timing and switch mechanism for a toasting period, a member operated by said device for engaging and moving said setting means to said second position to set said timing and switch mechanism during the lowering of said carrier to its toasting position, spring means for moving said setting means away from said member after it reaches said second position and for returning it to said first position so that during the toasting operation said member can be operated to move said carrier up from its toasting position and return it thereto for toast inspection all without resetting said timing mechanism.

JACOB L. SHROYER.

CERTIFICATE OF CORRECTION.

Patent No. 2,317,228.  April 20, 1943.

JACOB L. SHROYER.

It is hereby certified that error appears in the printed specification of the above numbered patent requiring correction as follows: Page 1, first column, line 17, for "employed" read --completed--; page 2, second column, line 28, strike out the comma at the end of the line and insert instead a period; page 6, first column, line 71, for "It" read --If--; page 7, second column, line 57, claim 8, after the word "position" insert a comma; page 8, first column, line 73, claim 11, for "energiza-" read --energization of said heating means, a second control--; and that the said Letters Patent should be read with this correction therein that the same may conform to the record of the case in the Patent Office.

Signed and sealed this 8th day of June, A. D. 1943.

(Seal)

Henry Van Arsdale,
Acting Commissioner of Patents.